(12) United States Patent
Kojima et al.

(10) Patent No.: US 6,522,527 B2
(45) Date of Patent: Feb. 18, 2003

(54) ANODE MEMBER FOR A SOLID ELECTROLYTIC CAPACITOR, AN ELECTROLYTIC CAPACITOR USING THE SAME, AND A METHOD OF MAKING THE SAME

(75) Inventors: Koichi Kojima, Hirakata (JP); Kiyoshi Hirota, Hirakata (JP); Junichi Kurita, Neyagawa (JP); Yuji Mido, Higashiosaka (JP); Ayumi Kochi, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/160,258

(22) Filed: Jun. 4, 2002

(65) Prior Publication Data

US 2003/0007318 A1 Jan. 9, 2003

(30) Foreign Application Priority Data

Jun. 6, 2001 (JP) ........................ 2001-170592

(51) Int. Cl.$^7$ ................................ H01G 9/00
(52) U.S. Cl. .................. 361/523; 361/528; 361/529
(58) Field of Search ................. 361/523, 524, 361/528, 529, 532, 541, 531

(56) References Cited

U.S. PATENT DOCUMENTS 6,392,869 B2 * 5/2002 Shiraishi et al. ........... 361/523

FOREIGN PATENT DOCUMENTS

JP  2000-306782  11/2000

OTHER PUBLICATIONS

Michaluk et al. US 2002/0072475 A1, Jun. 13, 2002.*

* cited by examiner

Primary Examiner—Anthony Dinkins
(74) Attorney, Agent, or Firm—McDermott, Will & Emery

(57) ABSTRACT

The anode member for a solid electrolytic capacitor according to the present invention comprises an anode body made of a valve metal foil having a purity of not less than 99 wt %, and an anode layer formed on the anode body and made of a sintered body of a valve metal powder. By limiting the amount of impurity contained in the valve metal foil to an amount of not more than 1 wt %, impurities in a dielectric oxide film formed by anodic oxidation, namely defects in the dielectric oxide film can be suppressed, so that the resultant solid electrolytic capacitor can have its leakage current lowered with its ESR (equivalent series resistance) being kept low, and that the electrolytic capacitor can be made to have a smaller size and a higher capacitance. The present invention also provides an electrolytic capacitor having a low leakage current, a low ESR, a small size and a high capacitance by using the above novel anode member as well as a method of making the same.

9 Claims, 3 Drawing Sheets

Purity of valve metal foil (wt%)

ANODE MEMBER FOR A SOLID ELECTROLYTIC CAPACITOR, AN ELECTROLYTIC CAPACITOR USING THE SAME, AND A METHOD OF MAKING THE SAME

BACKGROUND OF THE INVENTION

The present invention relates to capacitors used in various electronic equipment, particularly to an anode member using valve metals for a solid electrolytic capacitor, an electrolytic capacitor using the same, and a method of making the same.

Generally, electrolytic capacitors used for e.g. secondary circuits of power sources and CPU peripheries of personal computers are strongly desired to be smaller in size and higher in capacitance, and also to be lower in the ESR (equivalent series resistance) for adaptation to high frequencies.

FIG. 1 is a perspective view of an anode member for a conventional solid electrolytic capacitor of such kind. Referring to FIG. 1, reference numeral 1 is a lead wire for an anode terminal, reference numeral 2 is an anode member made by molding a valve metal powder of e.g. tantalum or niobium to a given shape and by embedding the lead wire 1 in the mold of the vale metal powder. This kind of structure is called pellet structure, which is generally often used.

More specifically, the anode member 2 is made by: molding the valve metal powder having the lead wire 1 embedded therein to a molded body of the given shape; sintering the molded body; subjecting the sintered body to anodic oxidation to form a dielectric oxide film (not shown) on its outer surface; and then sequentially forming a solid electrolyte layer (not shown) on the dielectric oxide film and forming a cathode layer (not shown) thereon. An anode terminal (not shown) for external connection is connected to the lead wire 1 of the anode member 2, and a cathode terminal (not shown) for external connection is connected to the cathode layer. The thus processed body is subjected to a molding using a molding material such as epoxy resin to coat the anode member 2 with the molding material, thereby to make a solid electrolytic capacitor.

Furthermore, recently solid electrolytic capacitors using, as electrolyte, electrically conductive polymers, which have incomparably higher electric conductivities than conventionally used manganese dioxide, were developed and commercialized in order to realize lower ESR.

However, such a conventional anode member and an electrolytic capacitor using the anode member as described above have drawbacks in the difficulty of realizing smaller capacitors with higher capacitance.

A specific example of prior attempt to make such conventional electrolytic capacitors smaller in size and higher in capacitance is disclosed in Japanese Laid-open Patent Publication 2000-306782. FIG. 2 is a perspective view, partially in cross section, of a single layer solid electrolytic capacitor according to such prior attempt. As shown in FIG. 2, a solid electrolytic capacitor is proposed, which has: an anode body 3 made of a valve metal foil; a sheet form anode layer 4 formed on the anode body 3 and made of a sintered body having micro pores and being of a high CV valve metal powder; and a solid electrolyte layer 5 and a cathode layer 6 formed on the sheet form anode layer 4.

The above described anode body and the anode layer, as well as inner surfaces of the micro pores in the anode layer, have a dielectric oxide film formed thereon by having been subjected to anodic oxidation. However, on the surface of the valve metal foil of the anode body 3, impurities such as Fe, Si, alkaline metals and alkaline earth metals are likely to segregate. Furthermore, the surface area of the valve metal foil is incomparably larger than that of a lead wire having a usually often used diameter of 0.25 mm. Accordingly, such structure as of FIG. 2 is comparatively more influenced by the impurities in the metal foil composition, whereby leakage current of the resultant electrolytic capacitor increases. In other words, because of the use of the valve metal foil for the anode body 3, the dielectric oxide film formed by the anodic oxidation are likely to have more defects, so that the resultant solid electrolytic capacitor is likely to suffer larger leakage current.

BRIEF SUMMARY OF THE INVENTION

It is an object of the present invention to solve the problems of such prior art, and to provide an anode member for a solid electrolytic capacitor which, by using a high CV powder, can realize smaller size, higher capacitance, smaller leakage current and lower ESR. The present invention also provides an electrolytic capacitor using the anode member, and a method of making the anode member.

An anode member according to the present invention has a structure, comprising an anode body made of a valve metal foil having a purity of not less than 99 wt % and an anode layer made of a sintered body of a valve metal powder, which anode layer is formed on the anode body. By suppressing the amount of the impurity contained in the valve metal foil to an amount not more than 1 wt %, impurities in a dielectric oxide film formed by anodic oxidation can be lowered, so that defects in the dielectric oxide film can be decreased. Therefore, leakage current of the resultant solid electrolytic capacitor can be decreased.

The anode body preferably has a rough surface, i.e. alternating convex-concave surface. Thereby, impurities segregated on the surface of the valve metal foil can be lowered. At the same time, metal bonding between the anode body of the valve metal foil and the anode layer of the valve metal powder sintered body can be improved. Consequently, leakage current of the resultant solid electrolytic capacitor can be decreased.

Furthermore, it is preferred that tantalum or niobium be used for the valve metal foil, and that tantalum or niobium each of a purity of not less than 99 wt % be used for the valve metal powder in the valve metal powder sintered body. Thereby, good forming or anodic oxidation property, namely homogeneous composition and uniform thickness of the dielectric oxide film, can be realized with the impurity contained in the valve metal powder sintered body being suppressed to an amount of not more than 1 wt %, resulting in decreased defects in the dielectric oxide film. Accordingly, the resultant solid electrolytic capacitor can enjoy a decreased leakage current and a higher capacitance.

The solid electrolytic capacitor according to the present invention comprises the following four elements that are sequentially stacked: an anode body made of a valve metal foil having a purity of not less than 99 wt %; an anode layer made of a valve metal powder sintered body; a solid electrolyte layer; and a cathode layer. Thereby, a solid electrolytic capacitor having a small leakage current can be obtained with a stable reproducibility.

Still further, the solid electrolyte layer preferably comprises an electrically conductive polymer material. Thereby, the electrical conductivity of the solid electrolyte layer can be made very high, and thus a very low ESR can be realized.

Another structure of a solid electrolytic capacitor according to the present invention comprises a stack of at least two solid electrolytic capacitor elements stacked on each other, each solid electrolytic capacitor element comprising an anode body made of a valve metal foil having a purity of not less than 99 wt %, an anode layer made of a valve metal powder sintered body, a solid electrolyte layer, and a cathode layer that are sequentially stacked on each other. Thereby, a solid electrolytic capacitor of a still lower ESR and a still higher capacitance can be obtained.

A method of making an anode member for a solid electrolytic capacitor according to the present invention comprises a step of forming a rough surface on an anode body by subjecting the surface of the anode body made of a valve metal foil having a purity of not less than 99 wt % to an etching treatment or a blasting treatment, and a step of forming, on the anode body, an anode layer made of a sintered body of a valve metal powder. By this method, a solid electrolytic capacitor having a small leakage current can be easily obtained.

While the novel features of the present invention are set forth particularly in the appended claims, the present invention, both as to organization and content, will be better understood and appreciated, along with other objects and features thereof, from the following detailed description taken in conjunction with the drawings.

DETAILED DESCRIPTION OF THE INVENTION

Hereinafter, presently preferred embodiments to carry out the present invention will be described with reference to the drawings, and more specifically described using Examples. However, the present invention, as defined in the appended claims, is not limited to such certain embodiments or Examples.

Figure 1:
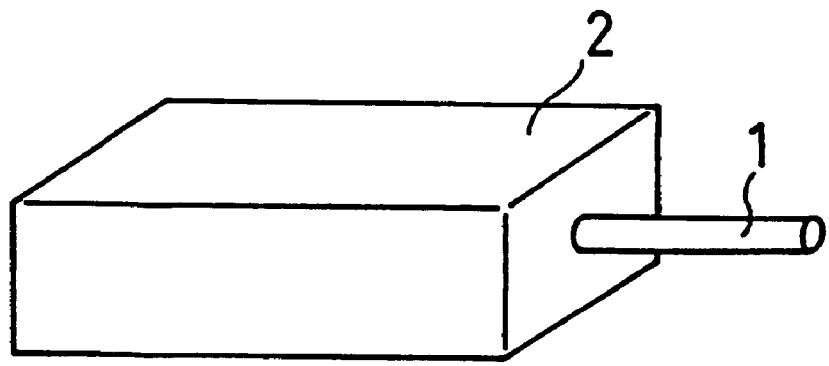
FIG. 1 is a perspective view of a conventional anode member, called pellet structure, for a conventional solid electrolytic capacitor.
Figure 2:
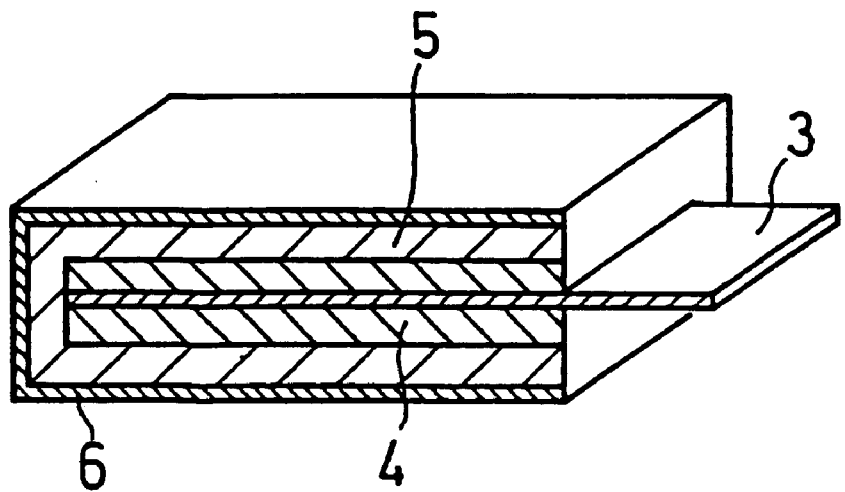
FIG. 2 is a perspective view, partially in cross section, of a conventional single layer solid electrolytic capacitor using another conventional anode member.
Figure 3:
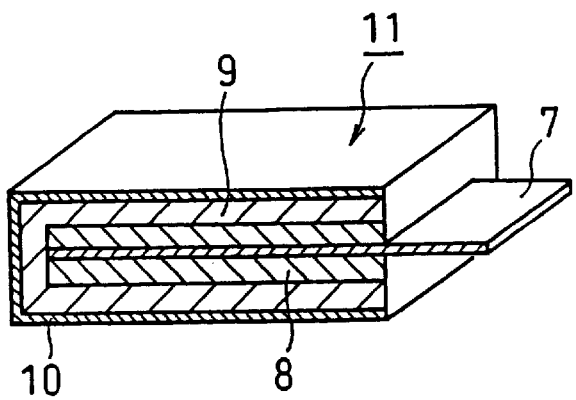
FIG. 3 is a perspective view, partially in cross section, of a single layer solid electrolytic capacitor according to the present invention using an anode member according to the present invention.

FIG. 3 is a perspective view, partially in cross section, of a single layer solid electrolytic capacitor according to the present invention, made by using an anode member according to the present invention. Referring to FIG. 3, reference numeral 7 is an anode body, and is made of a tantalum foil or a niobium foil each having a purity of not less than 99 wt %. The thickness of the anode 7 can be varied with various uses. Usually, its thickness is designed to be 20 to 70 μm. A paste of tantalum powder or niobium powder, as a high CV valve metal, is coated on the top and rear surfaces of the anode body 7, and is pressure-molded to a given dimension and thickness. The thus made molded body is sintered in vacuum, thereby to form, on the anode body, an anode layer 8 made of a sintered body of a valve metal powder. The metal foil of the anode body 7 and the sintered body of the anode layer 8 are metal-bonded at the boundary surface thereof. Further, the anode layer 8 has many micro pores inside thereof. The thickness of the anode layer 8 can be varied with a variety of uses. Usually, its thickness is designed to be 50 to 150 μm. The anode body 7 and the anode layer 8 constitute an anode member. This anode member is subjected to anodic oxidation while being supplied with a given forming voltage, whereby a dielectric oxide film, which is a main element to bear the capacitance of a resultant solid electrolytic capacitor, is formed on the surfaces of the anode layer 8, the inner surfaces of the micro pores in the anode layer, and a part of the surface of the anode body 7, on which part the anode body is not metal-bonded with the anode layer. The thickness of such dielectric oxide film is in proportion with the forming voltage. With a forming voltage of 20 V, for example, its thickness becomes about some hundred Å.

One of the most important points of the present invention is in the use of a valve metal foil, made of tantalum or niobium, having a purity of not less than 99 wt %. That is, the important point of the present invention is based on such discovery by the present inventors that, in the range of 99 wt % or above, the leakage current of resultant solid electrolytic capacitors can be minimized, and further that in such range, the influence of the variation of the purity of valve metal foil on the variation of the resultant leakage current can also be minimized. In a range of less than 99 wt %, it becomes difficult to sufficiently decrease the resultant leakage current. Further, in such range, the influence of the variation of the purity of the valve metal foil on the variation of the resultant leakage current becomes large. This is considered to be because in such low purity range, the thickness and the composition of the dielectric oxide film become non-uniform and inhomogeneous, respectively, so that many undesired defects are produced in the dielectric oxide film.

It is preferred that the anode body have a rough surface, i.e. alternating convex-concave surface. This is because by providing the rough surface, namely by subjecting the surface of the anode body to a surface roughening treatment, such as etching treatment and blasting treatment, having a function to chemically or mechanically scrape off or scratch off the surface of the anode body, the impurities segregated on the surface of the valve metal foil of the anode body can be lowered. Furthermore, by providing the rough surface on the anode body, the contact area of the surface of the anode body increases, so that the metal bonding between the valve metal foil and the valve metal sintered body is improved. This causes the connection between the valve metal foil and the valve metal sintered body is mechanically strengthened. Consequently, mechanical damage of the anode member can be decreased. The above described lowering of the impurities on the surface of the valve metal foil, and the decrease of the mechanical damage of the anode member allow the resultant solid electrolytic capacitor to decrease its leakage current.

Here, a preferable degree of the roughness of the surface of the anode body, i.e. alternating convex-concave surface, is 0.5 to 10 μm in terms of average distance between top points of the convexes and bottom points of the concaves of the rough surface. When such average distance becomes shorter than 0.5 μm, sufficient roughness cannot be realized, while when it becomes longer than 10 μm, sufficient strength of the metal foil of the anode body cannot be maintained.

Suitable processes for providing the rough surface are blasting treatment and etching treatment. In the case of the etching treatment, etchants containing alkalis or acids can be used. It is to be noted that tantalum is chemically very stable, and niobium is also chemically stable. Therefore, it is necessary to select suitable kinds of etchants from among alkalis and acids. An etchant considered to be most preferable is of an acid containing fluorine.

Further, for the valve metal powder sintered body in the anode member, it is preferable to use tantalum or niobium which has a purity of not less than 99 wt %. Such use contributes to a decrease of the leakage current and an increase of the capacitance of the resultant solid electrolytic capacitors. This is because, by suppressing the impurity contained in the valve metal powder sintered body to an amount of not more than 1 wt %, the formability or capability of anodic oxidation of the anode member can be improved, and the dielectric constant of the dielectric oxide film can be increased. When such purity becomes lower than 99 wt %, the leakage current of the resultant solid electrolytic capacitors become too large.

In FIG. 3, reference numeral 9 designates a solid electrolyte layer. On the anode layer 8 of the anode member having the dielectric oxide film as made above, a solid electrolyte material is coated, and is subjected to necessary processes to form the solid electrolyte layer 9. Usual materials such as manganese dioxide can be used for the solid electrolyte material, but it is preferable to use electrically conductive polymer materials having a high electric conductivity for the purpose of lowering the ESR of resultant solid electrolytic capacitors. Suitable materials for such electrically conductive polymer materials are polypyrrole, polythiophene and polyaniline.

Reference numeral 10 in FIG. 3 is a cathode layer formed on the solid electrolyte layer 9. A representative process of forming the cathode layer is to form a carbon layer on the solid electrolyte layer 9, coat a silver paste on the carbon layer, and cure the silver paste to form a silver electrode layer. Reference numeral 11 designates the thus made single layer type solid electrolytic capacitor comprising the anode body 7 made of a valve metal foil having a purity of not less than 99 wt %, the anode layer 8 made of a valve metal powder sintered body, the solid electrolyte layer 9 and the cathode layer 10 that are sequentially stacked, wherein the anode body 7 and the anode layer 8 respectively comprise a dielectric oxide film.

Figure 4:
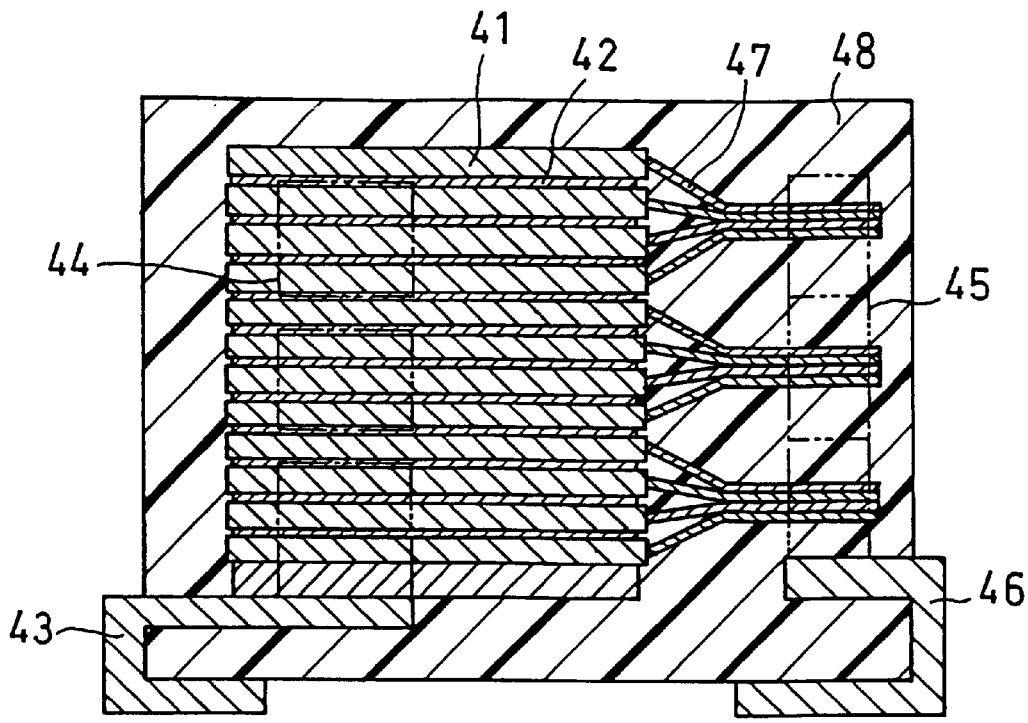
FIG. 4 is a cross-sectional view of a stack type solid electrolytic capacitor according to the present invention, with stacked solid electrolytic capacitor elements each using an anode member according to the present invention.

In the following, an example of a stack type solid electrolytic capacitor according to the present invention will be described with reference to FIG. 4. FIG. 4 is a cross-sectional view of an example of a stack type electrolytic capacitor having stacked solid electrolytic capacitor elements each using an anode member according to the present invention.

Reference numeral 41 is a solid electrolytic capacitor element, and has a structure essentially similar to that of the single layer type solid electrolytic capacitor as described above. In FIG. 4, 12 pieces each being such solid electrolytic capacitor element 41 are stacked to form a capacitor element stack. The solid electrolytic capacitor elements 41 respectively have, as respective outermost layers, carbon layers as cathode layers, which are each electrically connected by a silver electrode layer 42 formed by curing a silver paste. Thus, the silver electrode layer 42 can also be considered to be a part of each cathode layer of the solid electrolytic capacitor element 41. Although not apparent from FIG. 4, the silver electrode layer 42 exists on and cover whole of the side surfaces of the capacitor element stack, whereby all the silver electrode layers 42 are electrically connected to each other.

Reference numeral 44 shown by two-dot chain lines is a comb-shaped cathode terminal for mechanically fixing and electrically connecting a plurality of neighboring solid electrolytic capacitor elements. Although not apparent from the cross-sectional view of FIG. 4, the comb-shaped cathode terminal fixes the capacitor element stack at the side surface of the capacitor element stack. Reference numeral 43 is an external cathode terminal electrically connected to the comb-shaped cathode terminal 44 for electrically connecting the cathode layer of each solid electrolytic capacitor element 41 to outside, and for collecting electric currents.

On the other hand, reference numeral 47 is an anode body in and extending outside from each solid electrolytic capacitor element 41. In the case of the example shown in FIG. 4, four anode bodies 47 of neighboring four solid electrolytic capacitor elements are tied in a bundle. Although not apparent from the cross-sectional view of FIG. 4, reference numeral 45 shown by two-dot chain lines designates a comb-shaped anode terminal for electrically and mechanically connecting the respective tied anode bodies 7. Plural such comb-shaped anode terminals are electrically connected to each other. Reference numeral 46 designates an external anode terminal electrically connected to the comb-shaped anode terminals 45 for electrically connecting the anode bodies 47 of the solid electrolytic capacitor elements 41 to outside, and for collecting electric currents. Reference numeral 48 designates an exterior resin for molding the above described main constituting elements including the capacitor element stack.

Figure 5:
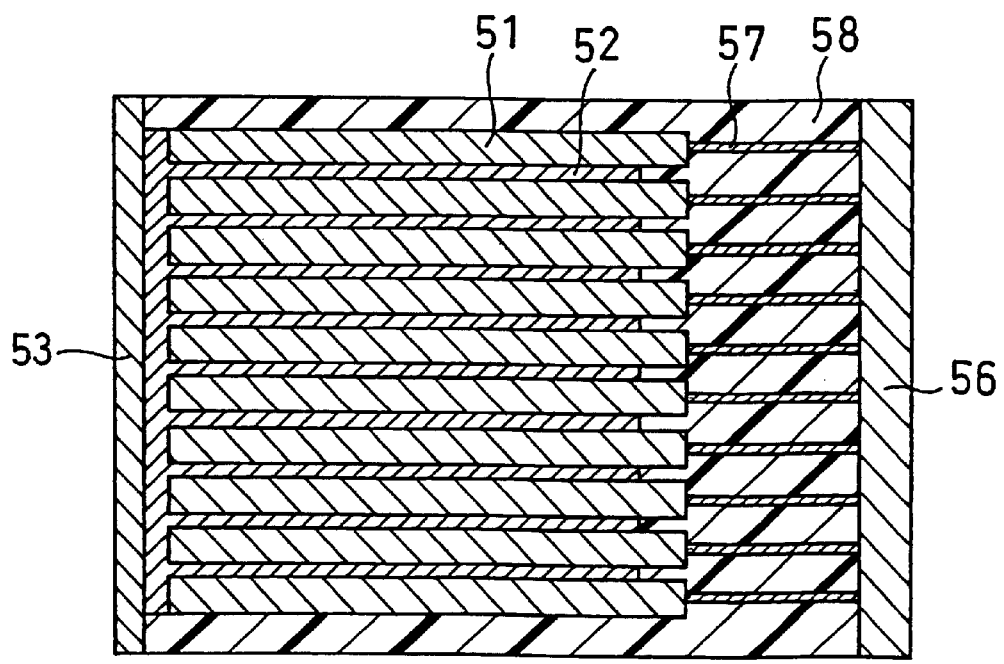
FIG. 5 is a cross-sectional view of another stack type solid electrolytic capacitor according to the present invention.

In the following, another example of a stack type solid electrolytic capacitor according to the present invention will be described with reference to FIG. 5. FIG. 5 is a cross-sectional view of such another example of stack type solid electrolytic capacitor having stacked solid electrolytic capacitor elements each using an anode member according to the present invention.

Reference numeral 51 is a solid electrolytic capacitor element, and has a structure essentially similar to that of the single layer type solid electrolytic capacitor as described above. In FIG. 5, ten pieces each being such solid electrolytic capacitor element 51 are stacked to form a capacitor element stack. The solid electrolytic capacitor elements 51 respectively have, as respective outermost layers, carbon layers as cathode layers, which are each electrically connected by a silver electrode layer 52 formed by curing a silver paste. Thus, the silver electrode layer 52 can also be considered to be a part of each cathode layer of the electrolytic capacitor element 51. Although not apparent from FIG. 5, the silver electrode layer 52 exists on and cover whole of the side surfaces of the capacitor element stack, whereby all the silver electrode layers 52 are electrically connected to each other. Reference numeral 53 is an external cathode terminal electrically connected to the silver electrode layer 52 for electrically connecting the cathode layer of each solid electrolytic capacitor element 51 to outside, and for collecting electric currents.

On the other hand, reference numeral 57 is an anode body in and extending outside from each solid electrolytic capacitor element 51. Reference numeral 56 designates an external anode terminal electrically connected to the anode bodies 57 of the solid electrolytic capacitor elements 51 for electrically connecting the anode bodies 57 to outside, and for collecting electric currents. Reference numeral 58 designates an exterior resin for molding the above described main constituting elements including the capacitor element stack.

Hereinafter, examples of the present invention will be specifically described in EXAMPLES with reference to comparative examples, including prior art examples, for comparing them.

EXAMPLE 1

As will be described in this Example, 19 samples of single layer type solid electrolytic capacitor elements were made with their constituting elements having been varied. These samples were subjected to measurements of their characteristics, and their differences with respect to electrostatic capacitance, ESR at 100 kHz and leakage current were studied. Table 1 shows results of such measurements. The constituting elements having been varied were tantalum purity as valve metal foil, existence of roughened surface of the valve metal foil, and material kind and purity of valve metal powder sintered body.

Example 1(1)

A first example, i.e. a sample of Example 1(1), having a structure shown in FIG. 3 was made in the following manner. A tantalum foil having a thickness of 30 $\mu$m and a purity of 99 wt % was prepared. This tantalum foil was immersed in an aqueous solution containing 5 wt % concentration of hydrofluoric acid for 10 minutes for etching the foil surface, thereby to roughen the foil surface to have alternating convex-concave surface. On the other hand, a tantalum powder, as a valve metal powder, having a purity of 99 wt % and a CV value of 100,000 was prepared. This powder was mixed with terpineol to make a powder paste. This powder paste was coated on a top and a rear surface of the above prepare foil having a roughened surface, and subjected to a pressure molding to make a molded body. This molded body was then sintered in a vacuum of $10^{-5}$ Torr or lower at a temperature of 1250° C. for 20 minutes, thereby to make a 180 $\mu$m thick anode member having a sheet shaped anode layer.

The thus made anode member was placed in an aqueous solution containing 10 wt % concentration of phosphoric acid. A counter electrode as cathode for anodic oxidation was separately prepared and placed in the phosphoric acid. A voltage of 10 V was applied between the anode member and the counter electrode to anodize the anode member, whereby a dielectric oxide film was formed on the anode member. Then, a polypyrrole layer having a thickness of 25 $\mu$m as a solid electrolyte layer was formed on the above made anode member having the dielectric oxide film. For forming the polypyrrole layer, a repetitive chemical oxidation polymerization process was employed. That is, in one chemical oxidation polymerization process, the anode member having the dielectric oxide film was dipped in a liquid material composed of a pyrrole monomer and an oxidizing agent, and was pulled out of the liquid material, and then was heat cured. This chemical oxidation polymerization process was repeated plural times, thereby to form the polypyrrole layer.

Lastly, on the thus prepared solid electrolytic layer, a carbon layer was formed. On the carbon layer, a silver paste was coated and heat cured to make a cathode layer, whereby a sample of a single layer type solid electrolytic capacitor element having a thickness of 0.25 mm was made.

The thus made sample of Example 1(1) was measured, by using a standard measuring method as defined by JIS (Japanese Industrial Standard) C-5102, with respect to three characteristics, namely electrostatic capacitance, ESR at 100 kHz and leakage current. As shown in Table 1, column of Example 1(1), the results of the measurements indicated that the three characteristics were 150 $\mu$F, 40 m$\Omega$·100 kHz and 30 $\mu$A, respectively.

Example 1(2)

Next, a sample of Example 1(2) was made. This sample was made in the same manner as that employed in making the sample of Example 1(1) as described above, except that niobium having a purity of 99 wt % was used in place of the tantalum having a purity of 99 wt % as used in Example 1(1) for the powder material of the metal powder sintered layer for the anode layer. The three characteristics of the thus made sample of this Example 1(2) are shown in Table 1, column of Example 1(2).

Example 1(3)

Next, a sample of Example 1(3) was made. This sample was made in the same manner as that employed in making the sample of Example 1(1) as described above, except that here the etching process as used in Example 1(1) was not employed, so that the valve metal foil here did not have a roughened surface. The three characteristics of the thus made sample of this Example 1(3) are shown in Table 1, column of Example 1(3).

Examples 1(4) to 1(8)

Five samples of Examples 1(4) to 1(8) were made in a manner the same as those described above in Examples 1(1) to 1(3), except that purities of tantalum foils as valve metal foil, existence of roughed surfaces of the foils, and material kinds of the powder materials for the valve metal powder sintered bodies were partially varied as shown in Table 1, columns of Examples 1(4) to 1(8). The three characteristics of each of the thus made five samples are also shown in Table 1 in the corresponding columns.

In correspondence with these eight samples of Examples 1(1) to 1(8), eight prior art samples, i.e. Prior art 3 to 10, were respectively made in correspondingly the same manners, except that the valve metal foils in Prior art samples 3 to 10 had a purity of 97 wt % or 98 wt % in place of 99 wt % as used in Examples 1(1) to 1(8). The three characteristics of such eight prior art samples were also measured, and are shown in Table 1 in the corresponding columns.

Figure 6:
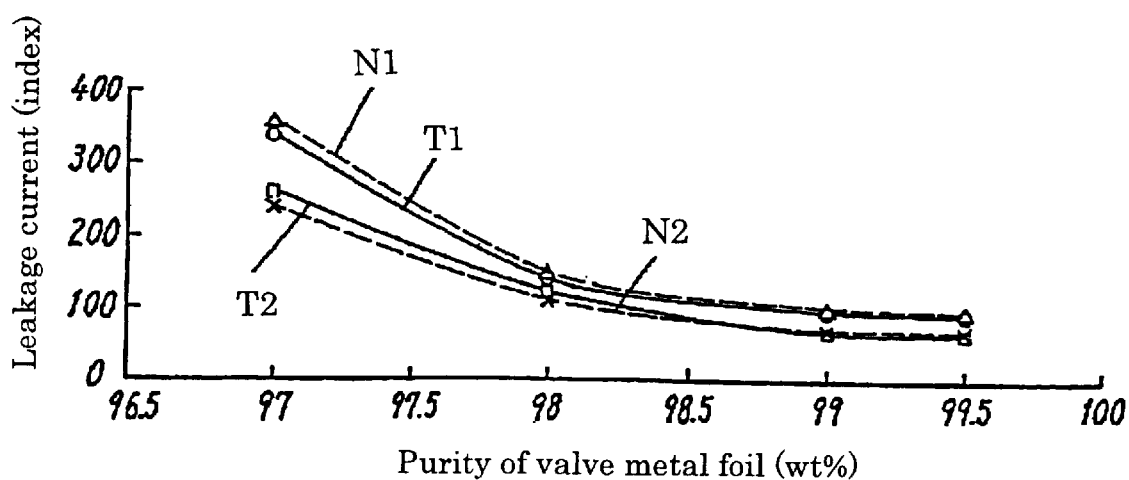
FIG. 6 is a graph showing the relation between foil purity and leakage current in order to show differences between leakage currents of single layer solid electrolytic capacitors using anode members according to the present invention and those of single layer solid electrolytic capacitors using conventional anode members.

With respect to such sixteen samples, their valve metal foil purities and measured leakage currents were plotted in a graph of FIG. 6. Thus, FIG. 6 shows relations between valve metal foil purities and leakage currents regarding these sixteen samples, where the values of the leakage currents are indicated by normalized index. More specifically, FIG. 6 shows differences in leakage current between a group of single layer solid electrolytic capacitors using anode members with valve metal foils having purities of not lower than 99 wt % according to the present invention and a group of those with valve metal foils having purities lower than 99 wt % according to prior art.

Referring to the graph of FIG. 6, N1 designates a plotted curve with respect to Prior art 6 and 10, and Example 1(4)

and 1(8). In other words, it shows leakage currents of the samples, in which niobium is used for the valve metal powders, and the valve metal foils do not have roughened surfaces. Meanwhile, T1 designates a plotted curve with respect to Prior art 5 and 9, and Example 1(3) and 1(7). In other words, it shows leakage currents of the samples, in which tantalum is used for the valve metal powders, and the valve metal foils do not have roughened surfaces.

On the other hand, T2 designates a plotted curve with respect to Prior art 3 and 7, and Examples 1(1) and 1(5). In other words, it shows leakage currents of the samples, in which tantalum is used for the valve metal powders, and the valve metal foils have roughened surfaces, namely surfaces having alternating convexes-concaves. Meanwhile, N2 designates a plotted curve with respect to Prior art 4 and 8, and Examples 1(2) and 1(6). In other words, it shows leakage currents of the samples, in which niobium is used for the valve metal powders, and the valve metal foils have roughened surfaces. It is to be noted here that in the graph of FIG. 6, the leakage current of the sample of Example 1(3) is designated as the standard of the normalized index, i.e. 100.

It is apparent from the graph of FIG. 6 that as the purity of the valve metal foil for the anode body increases, the leakage current decreases and gets saturated in the range of the valve metal foil purity of 99 wt % or above. Namely, in such range of 99 wt % or above, the leakage currents of the resultant solid electrolytic capacitors can be minimized. Furthermore, in such range, the influence of the variation of the purity of valve metal foil on the variation of the resultant leakage current can also be minimized. It is also apparent from the graph of FIG. 6 that in such purity range of less than 99 wt %, the leakage currents of the resultant solid electrolytic capacitors become large, and that the influence of the variation of the purity of the valve metal foil on the variation of the resultant leakage current becomes large.

It is also evident from the graph of FIG. 6 that the existence of the roughened surfaces on the valve metal foils allows the resultant leakage currents to further decrease in comparison with the case where the valve metal foils do not have roughened surfaces. Besides, although the roughened surfaces were provided by the etching treatment in the above samples, it was confirmed that similar effects by the roughened surfaces were obtained when such roughened surfaces were provided by using blasting treatment, which is ordinarily used for roughening metal surfaces. Details of the process of such blasting treatment are not described here.

Example 1(9)

Next, in order to study the influence caused by the variation of purity of the powder in the valve metal powder sintered body, a sample of Example 1(9) was made. This sample was made in a manner the same as that used in making the sample of Example 1(1), except that here a tantalum powder having a purity of 99.5 wt % was used in place of the tantalum powder having a purity of 99 wt %. The three measured characteristics of the thus made sample of Example 1(9) are shown in Table 1, column of Example 1(9). For comparison, samples of Comparative Examples 1(1) and 1(2) were made in a manner the same as that used in making the sample of Example 1(1), except that here two tantalum powders respectively having purities of 97 wt % and 98 wt % were used in place of the tantalum powder having a purity of 99 wt %. The three measured characteristics of each of the two samples of Comparative Examples are shown in the corresponding columns of Table 1.

As evident from the data shown in the columns of Comparative Examples 1(1), 1(2) and Examples 1(1), 1(9) of Table 1, the resultant leakage current becomes incomparably large when the purity of the valve metal powder is lower than 99 wt %. On the other hand, it is evident that with the purity of not less than 99 wt %, the leakage current can be made small.

EXAMPLE 2

As will be described in this Example, 9 samples of solid electrolytic capacitor elements and capacitor element stacks were made, with their constituting elements and number of stacked elements having been varied. These samples were subjected to measurements of characterstics, and their differences with respect to electrostatic capacitance, ESR at 100 kHz and leakage current were studied. Table 1 shows results of such measurements. The constituting elements having been varied were anode body shape, foil material, powder material of valve metal powder sintered body, CV value of valve metal powder, solid electrolyte material, number of stacked capacitor elements and thickness of capacitor element (or thickness of capacitor element stack in the case of stacked capacitor elements).

Examples 2(1) and 2(2)

By using the process of making the sample of single layer solid electrolytic capacitor of Example 1(1) as described above, 10 such samples were made. Two out of such 10 samples were stacked by using the stacking process as described with reference to FIG. 5 to make a capacitor element stack. The thus made capacitor element stack is sample of Example 2(1). The rest eight samples were also stacked in the same manner to make a capacitor element stack as a sample of Example 2(2). These two samples were subjected to the measurements the same as those described above, and the results are shown in Table 1.

As evident from Table 1, the thickness of the capacitor element stack, the electrostatic capacitance and the leakage current increase in proportion to the number of stacked capacitor elements. On the other hand, the ESR values decrease as the number of stacked elements increases.

Examples 2(3), 2(4) and 2(5)

By using the process of making the sample of single layer solid electrolytic capacitor element of Example 1(1) as described above, except that here niobium was used in place of tantalum for the valve metal foil material and the valve metal powder, 11 same samples were made. One out of the thus made eleven samples is a sample of Example 2(3). Two out of the rest 10 samples were stacked by using the stacking process as described with reference to FIG. 5 to make a capacitor element stack. The thus made capacitor element stack is a sample of Example 2(4). The rest eight samples were also stacked in the same manner to make a capacitor element stack as a sample of Example 2(5). These three samples were subjected to the measurements the same as those described above, and the results are shown in Table 1.

As evident from Table 1, with niobium foils and niobium powders, characteristics similar to those with tantalum foils and tantalum powders can be obtained. Furthermore, it is also evident that the thickness of the capacitor element stack, the electrostatic capacitance and the leakage current increase in proportion to the number of stacked capacitor elements. On the other hand, the ESR values decrease as the number of stacked elements increases.

Examples 2(6) and 2(7)

By using the process of making the sample of single layer solid electrolytic capacitor element of Example 1(1) as described above, except that here polythiophene and polyaniline were used in place of polypyrrole for the solid electrolyte material, two samples were made. These are samples of Examples 2(6) and 2(7), each being a single layer solid electrolytic capacitor element. These two samples were subjected to the measurements the same as those described above, and the results are shown in Table 1.

As evident from Table 1, with polythiophene and polyaniline, characteristics similar to those with polypyrrole can be obtained.

Lastly, for further comparison, two samples, as other prior art, each using an anode member having a pellet structure were made. Firstly, a sample of Prior art 1 was made in the following manner. A tantalum wire having a diameter of 0.25 mm was embedded in a tantalum powder having a CV value of 40,000 and a purity of 99 wt %. This powder with the tantalum wire was molded to a given shape to form a molded body. This molded body was sintered at a temperature of 1,450° C. for 20 minutes, whereby an anode member having a thickness of 0.84 mm was made. This anode member was then subjected to anodic oxidation in a phosphoric acid aqueous solution containing 10 wt % concentration of phosphoric acid with an anodizing voltage of 10 V for 120 minutes, thereby to form a dielectric oxide film on the anode member. On the thus made anode member having the dielectric oxide film, a manganese dioxide layer having a thickness of 0.05 mm was formed by the following process. That is, manganese nitrate was coated on the anode member, and was then pyrolyzed to form the manganese dioxide layer as a solid electrolyte layer. On the manganese dioxide layer, a carbon layer was formed, and further a cathode layer was formed thereon by coating and curing a silver thereon. In this way, a prior art sample of a single layer solid electrolytic capacitor element having a thickness of 0.96 mm was made. The thus made sample is a sample of Prior art 1 as listed in Table 1.

A sample of Prior art 2, being a single layer solid electrolytic capacitor element and having a thickness of 0.96 mm, was made in the same manner as employed for making the Prior art 1 sample as described above, except that here polypyrrole was used as the solid electrolyte layer in place of manganese dioxide as used for Prior art 1 sample. These two samples of Prior art 1 and 2 were subjected to the measurements the same as those described above, and the results are shown in Table 1.

It is evident from the above description including Table 1 that the samples according to the present invention, i.e. Examples 2(1) to 2(7) as well as Examples 1(1) to 1(9), have advantageous characteristics over the samples according to the prior art and comparative examples, i.e. Prior art 1 to 10 and Comparative Examples 1 and 2. That is, certain samples according to the present invention, as compared with certain samples of the prior art and comparative examples, have smaller leakage currents. The other samples according to the present invention have lower ESR or smaller thicknesses of the capacitor elements even though their leakage currents may be comparable to those of the other samples of the prior art or comparative examples.

TABLE 1

| Examples/ Comparative Examples | Anode body shape | Foil material (purity) | Roughened surface | Powder (purity) | CV/g of powder (μFV/g) | Solid electrolyte material | Number of stacks | Element (capacitor) thickness (mm) | Electrostatic capacitance (μF) | ESR (mΩ · 100 kHz) | Leakage current (μA) |
|---|---|---|---|---|---|---|---|---|---|---|---|
| Prior art 1 | lead wire | — | — | tantalum (99%) | 40,000 | manganese dioxide | 1 | 0.96 | 250 | 100 | 20 |
| Prior art 2 | lead wire | — | — | tantalum (99%) | 40,000 | polypyrrole | 1 | 0.96 | 220 | 40 | 40 |
| Prior art 3 | foil | tantalum (97%) | Yes | tantalum (99%) | 100,000 | polypyrrole | 1 | 0.25 | 150 | 40 | 115 |
| Prior art 4 | foil | tantalum (97%) | Yes | niobium (99%) | 100,000 | polypyrrole | 1 | 0.25 | 150 | 40 | 106 |
| Prior art 5 | foil | tantalum (97%) | No | tantalum (99%) | 100,000 | polypyrrole | 1 | 0.25 | 150 | 40 | 151 |
| Prior art 6 | foil | tantalum (97%) | No | niobium (99%) | 100,000 | polypyrrole | 1 | 0.25 | 150 | 40 | 161 |
| Prior art 7 | foil | tantalum (98%) | Yes | tantalum (99%) | 100,000 | polypyrrole | 1 | 0.25 | 150 | 40 | 55 |
| Prior art 8 | foil | tantalum (98%) | Yes | niobium (99%) | 100,000 | polypyrrole | 1 | 0.25 | 150 | 40 | 48 |
| Prior art 9 | foil | tantalum (98%) | No | tantalum (99%) | 100,000 | polypyrrole | 1 | 0.25 | 150 | 40 | 62 |
| Prior art 10 | foil | tantalum (98%) | No | niobium (99%) | 100,000 | polypyrrole | 1 | 0.25 | 150 | 40 | 66 |
| Example 1 (1) | foil | tantalum (99%) | Yes | tantalum (99%) | 100,000 | polypyrrole | 1 | 0.25 | 150 | 40 | 30 |
| Example 1 (2) | foil | tantalum (99%) | Yes | niobium (99%) | 100,000 | polypyrrole | 1 | 0.25 | 150 | 40 | 32 |
| Example 1 (3) | foil | tantalum (99%) | No | tantalum (99%) | 100,000 | polypyrrole | 1 | 0.25 | 150 | 40 | 43 |
| Example 1 (4) | foil | tantalum (99%) | No | niobium (99%) | 100,000 | polypyrrole | 1 | 0.25 | 150 | 40 | 47 |
| Example 1 (5) | foil | tantalum (99.5%) | Yes | tantalum (99%) | 100,000 | polypyrrole | 1 | 0.25 | 150 | 40 | 28 |
| Example 1 (6) | foil | tantalum (99.5%) | Yes | niobium (99%) | 100,000 | polypyrrole | 1 | 0.25 | 150 | 40 | 29 |
| Example 1 (7) | foil | tantalum (99.5%) | No | tantalum (99%) | 100,000 | polypyrrole | 1 | 0.25 | 150 | 40 | 40 |
| Example 1 (8) | foil | tantalum (99.5%) | No | niobium (99%) | 100,000 | polypyrrole | 1 | 0.25 | 150 | 40 | 42 |

TABLE 1-continued

| Examples/ Comparative Examples | Anode body shape | Foil material (purity) | Roughened surface | Powder (purity) | CV/g of powder (μFV/g) | Solid electrolyte material | Number of stacks | Element (capacitor) thickness (mm) | Electrostatic capacitance (μF) | ESR (mΩ · 100 kHz) | Leakage current (μA) |
|---|---|---|---|---|---|---|---|---|---|---|---|
| Com. Ex. 1 (1) | foil | tantalum (99%) | Yes | tantalum (97%) | 100,000 | polypyrrole | 1 | 0.25 | 130 | 50 | 300 |
| Com. Ex. 1 (2) | foil | tantalum (99%) | Yes | tantalum (98%) | 100,000 | polypyrrole | 1 | 0.25 | 140 | 45 | 100 |
| Example 1 (9) | foil | tantalum (99%) | Yes | tantalum (99.5%) | 100,000 | polypyrrole | 1 | 0.25 | 150 | 40 | 15 |
| Example 2 (1) | foil | tantalum (99%) | Yes | tantalum (99%) | 100,000 | polypyrrole | 2 | 0.50 | 300 | 22 | 60 |
| Example 2 (2) | foil | tantalum (99%) | Yes | tantalum (99%) | 100,000 | polypyrrole | 8 | 2.00 | 1,200 | 10 | 240 |
| Example 2 (3) | foil | niobium (99%) | Yes | niobium (99%) | 180,000 | polypyrrole | 1 | 0.25 | 180 | 40 | 35 |
| Example 2 (4) | foil | niobium (99%) | Yes | niobium (99%) | 180,000 | polypyrrole | 2 | 0.50 | 360 | 20 | 70 |
| Example 2 (5) | foil | niobium (99%) | Yes | niobium (99%) | 180,000 | polypyrrole | 8 | 2.00 | 1,440 | 8 | 280 |
| Example 2 (6) | foil | tantalum (99%) | Yes | tantalum (99%) | 100,000 | poly-thiophene | 1 | 0.25 | 140 | 38 | 35 |
| Example 2 (7) | foil | tantalum (99%) | Yes | tantalum (99%) | 100,000 | polyamiline | 1 | 0.25 | 130 | 42 | 28 |

Thus, the samples according to the present invention can realize capacitor elements of smaller sizes and higher capacitances with smaller leakage currents.

In view of the foregoing, according to the present invention, which requires the impurity content in the valve metal foil to be less than 1 wt %, the dielectric oxide film formed by anodic oxidation can have decreased defects therein owing to decreased impurities therein. Therefore, resultant solid electrolytic capacitors can have decreased leakage currents with the ESR being maintained to be low, and further can have higher capacitances with smaller sizes by using high CV valve metal powders.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An anode member for a solid electrolytic capacitor, comprising: an anode body made of a valve metal foil having a purity of not less than 99 wt %; and an anode layer made of a sintered body of a valve metal powder, said anode layer being formed on said anode body.

2. An anode member for a solid electrolytic capacitor according to claim 1, wherein said anode body has a roughened surface thereon.

3. An anode member for a solid electrolytic capacitor according to claim 1, wherein said valve metal foil comprises tantalum or niobium, and said valve metal powder comprises tantalum or niobium, each having a purity of not less than 99 wt %.

4. A solid electrolytic capacitor comprising an anode body made of a valve metal foil having a purity of not less than 99 wt %, an anode layer made of a sintered body of a valve metal powder, a solid electrolyte layer, and a cathode layer which are sequentially stacked, said anode body and said anode layer having a dielectric oxide film.

5. A solid electrolytic capacitor according to claim 4, wherein said anode body has a roughened surface thereon.

6. A solid electrolytic capacitor according to claim 4, wherein said valve metal foil comprises tantalum or niobium, and said valve metal powder comprises tantalum or niobium, each having a purity of not less than 99 wt %.

7. A solid electrolytic capacitor according to claim 4, wherein said solid electrolyte layer comprises an electrically conductive polymer material.

8. A solid electrolytic capacitor comprising a stack of at least two solid electrolytic capacitor elements stacked on each other, each of said solid electrolytic capacitor elements comprising an anode body made of a valve metal foil having a purity of not less than 99 wt %, an anode layer made of a sintered body of a valve metal powder, a solid electrolyte layer, and a cathode layer that are sequentially stacked, said anode body and said anode layer having a dielectric oxide film.

9. A method of making an anode member for a solid electrolytic capacitor, comprising a step of preparing an anode body made of a valve metal foil having a purity of not less than 99 wt %, a step of providing a roughened surface on said anode body by using an etching treatment or a blasting treatment, and a step of forming an anode layer made of a sintered body of a valve metal powder.

* * * * *